United States Patent
Hall

(10) Patent No.: US 10,797,474 B1
(45) Date of Patent: Oct. 6, 2020

(54) FISH TAPE LEADER

(71) Applicant: Clarence Hall, Conyers, GA (US)

(72) Inventor: Clarence Hall, Conyers, GA (US)

(*) Notice: Subject to any disclaimer, the term of this patent is extended or adjusted under 35 U.S.C. 154(b) by 0 days.

(21) Appl. No.: 14/265,277

(22) Filed: Apr. 29, 2014

Related U.S. Application Data

(63) Continuation-in-part of application No. 29/454,304, filed on May 8, 2013, now Pat. No. Des. 726,516.

(60) Provisional application No. 61/817,280, filed on Apr. 29, 2013.

(51) Int. Cl.
  *H02G 1/08* (2006.01)
  *H02G 3/04* (2006.01)
  *G02B 6/44* (2006.01)

(52) U.S. Cl.
  CPC ............ *H02G 1/083* (2013.01); *H02G 3/04* (2013.01); *G02B 6/4465* (2013.01)

(58) Field of Classification Search
  CPC .......... H02G 1/08; H02G 1/081; H02G 1/083
  See application file for complete search history.

(56) References Cited

U.S. PATENT DOCUMENTS

| | | | | |
|---|---|---|---|---|
| 1,730,993 A * | 10/1929 | Buchanan | ............... | H02G 1/081 254/134.3 FT |
| 3,554,493 A * | 1/1971 | Bowden | ................. | H02G 1/086 254/134.3 FT |
| 4,453,291 A * | 6/1984 | Fidrych | ................ | G02B 6/4465 24/115 N |
| 4,460,159 A * | 7/1984 | Charlebois | ........... | G02B 6/4465 24/129 W |
| 4,684,161 A * | 8/1987 | Egner | ..................... | F16G 11/00 254/134.3 FT |
| 4,684,211 A * | 8/1987 | Weber | .................. | G02B 6/4465 254/134.3 R |
| 5,067,843 A * | 11/1991 | Nova | ...................... | F16G 11/00 254/134.3 FT |
| 5,621,977 A * | 4/1997 | Hampton | ............... | G01C 15/10 33/392 |
| 5,820,249 A * | 10/1998 | Walsten | ................. | H02G 1/081 362/119 |
| 5,938,180 A * | 8/1999 | Walsten | ................. | H02G 1/083 254/134.3 FT |
| 2007/0001157 A1* | 1/2007 | Quick | .................... | H02G 1/081 254/134.3 FT |
| 2007/0040157 A1* | 2/2007 | Turner | .................... | H02G 1/08 254/134.3 FT |
| 2011/0140058 A1* | 6/2011 | Pagliaroli | ............. | H02G 1/081 254/134.3 FT |

OTHER PUBLICATIONS

Magnepull XP 2000. https://www.youtube.com/watch?v=1OzsJgH8160 (Year: 2011).*
Magnepull Website screenshot. https://magnepull.com/magnepull (Year: 2019).*

\* cited by examiner

*Primary Examiner* — Tyrone V Hall, Jr.
(74) *Attorney, Agent, or Firm* — Michael J. Bootcheck, LLC; Michael J. Bootcheck

(57) ABSTRACT

A fish tape leader comprises a leader body extending along a longitudinal axis between a first end and a second end. A frustoconical cap is at the first end. A tail portion extends from the frustoconical cap to the second end. The fish tape leader further comprises an attachment portion configured to secure the leader body to a fish tape.

5 Claims, 5 Drawing Sheets

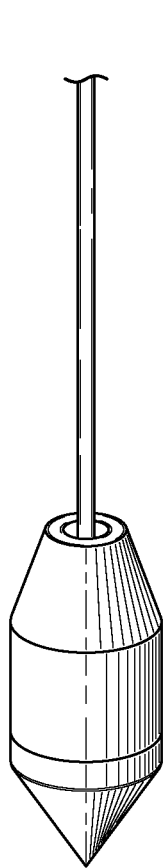
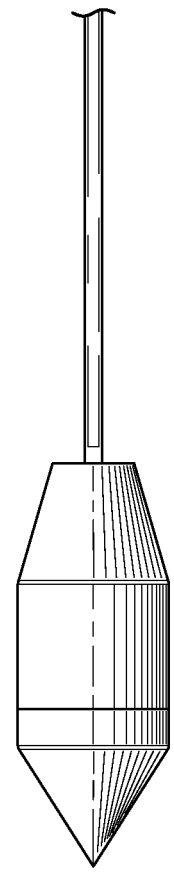
FIG. 1   FIG. 2
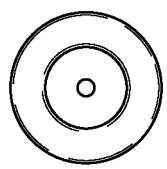
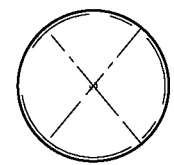
FIG. 3   FIG. 4

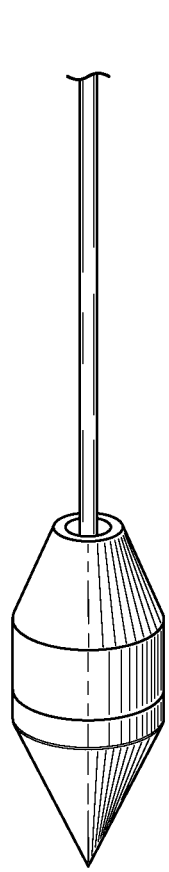
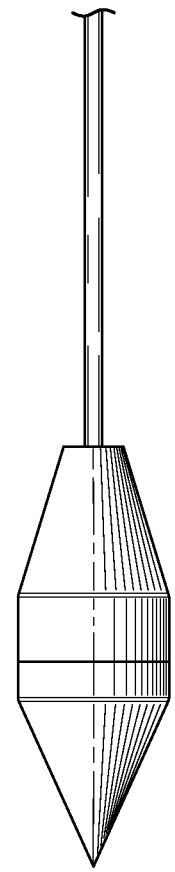
FIG. 5     FIG. 6
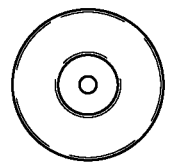
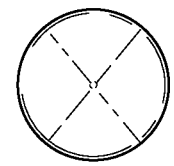
FIG. 7     FIG. 8

10,797,474 B1

FISH TAPE LEADER

CROSS-REFERENCE TO RELATED APPLICATIONS

This application claims priority from U.S. Provisional Application Ser. No. 61/817,280 filed Apr. 29, 2013, which is titled "FISH TAPE LEADER" and co-pending U.S. Design application Ser. No. 29/454,304 filed May 8, 2013, which is titled "FISH TAPE LEADER" which are each hereby incorporated by reference.

FIELD OF THE INVENTION

The present invention relates to fish tape leaders/fish tape assemblies/cable pullers. The device relates more specifically to leaders which may be attached to a fish tape, and which may be used to fish a wire or cable through a conduit.

BACKGROUND OF THE INVENTION

Fish tape may be used to run electrical or other cables or wires through conduits. Fish tapes may be made from a length of flat steel. A fish tape leader may be attached to an end of the fish tape. The fish tape leader serves as a head for the fish tape and allows for the tape to be extended or pulled through a length of conduit. One type of leader, herein called a pointed leader may be rounded, or pointed, to allow for the tape to be extended through a conduit (herein referred to as a "pointed leader"). Other fish leaders may have one or more holes to allow the cable or wire to be attached thereto, herein referred to as a "pull leader"). In use, the fish tape, with the fish tape leader/pointed leader attached thereto, is fed through the first end of a conduit by pushing the fish tape, and towards a second end of the conduit, where it exits the conduit. The user then attaches the wire or cable to the fish tape leader (whether a pointed leader or a pull leader), and then pulls the fish tape back through the conduit from the second end to the first end, to run the wire or cable through the conduit.

The conduit is often a pipe that contains (or will contain) the wire or cable, for example, behind a wall or in a floor or ceiling. The conduit is often bent, for example, bent back on itself 90 degrees or more, which increases the risk that the fish tape leader will get caught in the conduit. The user can pull back the fish tape and push again but this is tiring and difficult in a long run of pipe. Steel fish tapes lack flexibility to effectively bend around all shapes and barriers when used with current fish tape leaders. As a result, nylon has been used more commonly as a fish tape for very flexible conduits such as corrugated conduits that often bend 90 degrees or more. However, nylon fish tape attached to a leader lacking a frustoconical shaped cap will often become trapped when sent around bends of 90 degrees or more. What is needed is a product with a frustoconical cap on the pointed leader in order to be more efficiently pushed through the conduit.

SUMMARY OF THE INVENTION

The present invention is directed to a novel fish tape leader comprising a leader body extending along a longitudinal axis between a first end and a second end; a frustoconical cap at the first end; a tail portion extending from the frustoconical cap to the second end; and a cavity internal to the tail portion for receiving a crimped end of a fish tape.

The fish tape may be crimped in order to be attached to the fish tape leader, which requires the fish tape leader to be comprised of 2 pieces (i.e., frustoconical cap and tail portion) that can be readily disassembled and reassembled. Fish tape leaders comprised of 2 pieces, wherein one piece (i.e., the tail portion) is threadably receivable in the other piece to allow fish tape to be crimped on.

BRIEF DESCRIPTION OF THE FIGURES

FIGS. 1-13 illustrate various views of exemplary embodiments of the present invention. Illustrated are a pointed portion and tail portion and an additional pointed portion with one or more holes or slots wherein wire may be inserted, or attached, such that it may be pulled through a conduit;

DETAILED DESCRIPTION OF THE INVENTION

To promote an understanding of the principles of the present invention, descriptions of specific embodiments of the invention follow and specific language is used to describe the specific embodiments. It will nevertheless be understood that no limitation of the scope of the invention is intended by the use of specific language. Alterations, further modifications, and such further applications of the principles of the present invention discussed are contemplated as would normally occur to one ordinarily skilled in the art to which the invention pertains.

Figure 9:
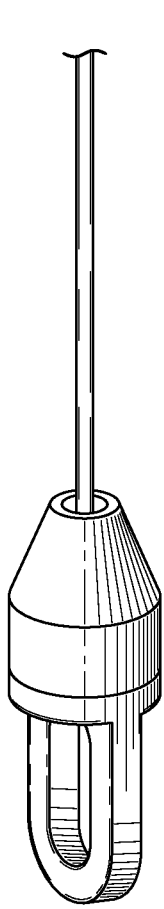
Figure 10:
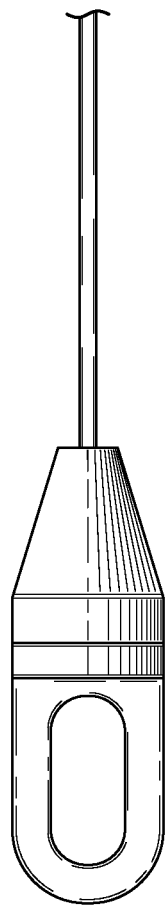
Figure 11:
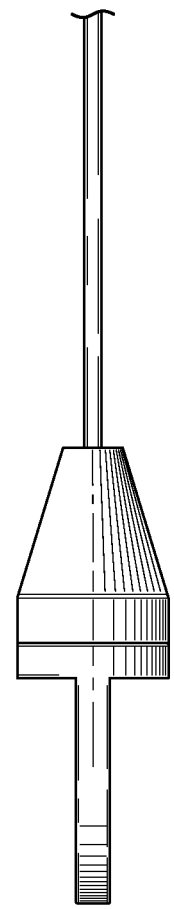
Figure 12:
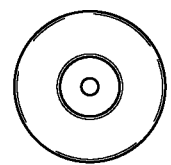
Figure 13:
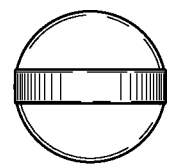

FIGS. 1-13 illustrate various views of exemplary embodiments of the present invention. Illustrated are a pointed portion and tail portion and an additional pointed portion with one or more holes or slots wherein wire may be inserted, or attached, such that it may be pulled through a conduit.

Figure 14C:
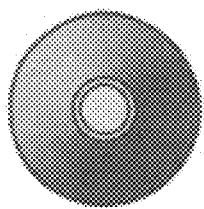
FIG. 14C is a bottom view of the exemplary embodiment fish tape leader of FIGS. 14A-B.
Figure 14B:
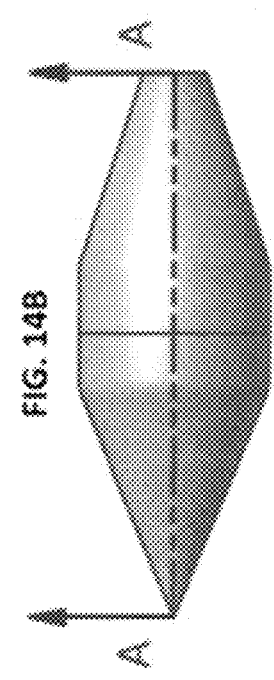
FIG. 14B is a side view of the exemplary embodiment fish tape leader of FIG. 14A.
Figure 14A:
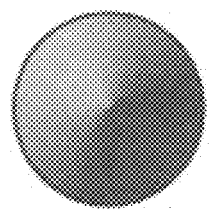
FIG. 14A is a top view of an exemplary embodiment fish tape leader.
Figure 14F:
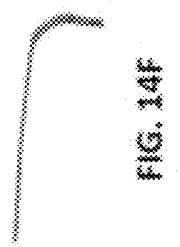
FIG. 14F is a partial side view of the exemplary embodiment fish tape leader of FIGS. 14A-E.
Figure 14E:
FIG. 14E is a partial side view of the exemplary embodiment fish tape leader of FIGS. 14A-D.
Figure 14D:
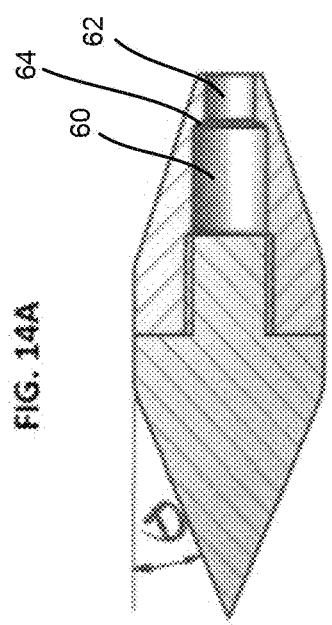
FIG. 14D is a cross-sectional side view of the exemplary embodiment fish tape leader of FIGS. 14A-C.
Figure 14K:
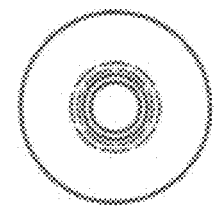
FIG. 14K is a bottom view of the lower portion showing interior hidden surfaces of the exemplary embodiment fish tape leader of FIGS. 14A-J.
Figure 14J:
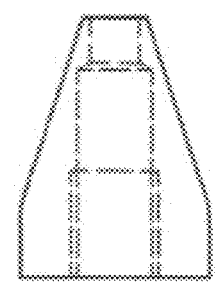
FIG. 14J is a side view of a lower portion showing interior hidden surfaces of the exemplary embodiment fish tape leader of FIGS. 14A-I.
Figure 14I:
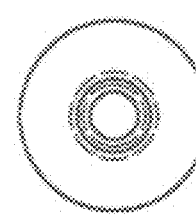
FIG. 14I is a top view showing interior hidden surfaces of a lower portion of the exemplary embodiment fish tape leader of FIGS. 14A-H.
Figure 14H:
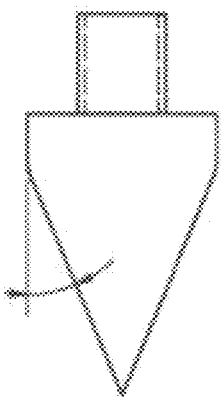
FIG. 14H is a side view of an upper portion of the exemplary embodiment fish tape leader of FIGS. 14A-G.
Figure 14G:
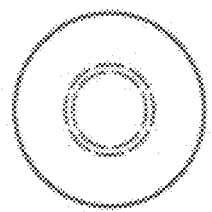
FIG. 14G is a top view showing interior hidden surfaces of an upper portion of the exemplary embodiment fish tape leader of FIGS. 14A-F.

FIGS. 14 A-K illustrate various views of an exemplary embodiment of the present invention. In this embodiment, an overall length OL is a distance from tip to tip of leader 10 (1.538 inches in this embodiment). Overall length OL may be broken down into subparts front length FL, mid length ML, and end length EL (i.e., OL=FL+ML+EL). Overall length OL may vary from 0.5 inches to 3 inches (the maximum length is limited in some part by the inner diameter of the conduit being snaked). Front length FL may vary from 0.1 inches to 1.5 inches. Mid length ML may vary from 0.0 inches to one inch and in some embodiments from 0.2 inches to 0.4 inches. End length EL may vary form 0.1 inches to 1 inch and in some embodiments from 0.25 inches to 0.6 inches. Angle Θ may vary from 10° to 50° and in some embodiments from 15° to 40°, and in other embodiments from 18° to 30°. Angle Φ may vary from 10° to 50° and in some embodiments from 15° to 40°. Angle β may vary from 0° to 45° and in some embodiments from 15° to 35°. Angle α may vary from 0° to 90° and in some embodiments from 20° to 90°, and in other embodiments from 50° to 70°. The end of the tail portion (i.e., at the end where the fish tape is exposed and inserted into the leader, the leader may have a sharp edge, may be angled such as by angle α (and/or Φ), may be rounded or filleted, or otherwise shaped so as to more freely travel through the conduit without getting caught up. Further, at the pointed end (i.e., a the end of the leader opposite the tail, the tip may be pointed as shown in various figures, may be rounded, blunted, clipped, or otherwise angled (i.e., in some embodiments, there may be no sharp edges on the pointed portion and/or the tail portion of the leader, whereas other embodiments may have one or more sharp edges). Angle β is the angle of motion by which the fish tape may be pivoted with respect to the leader. In some embodiments, the fish tape has a generally rectangular cross-sectional shape. In some embodiments, the slot of the leader through which the tape is inserted is round. As one axis of the tape has a relatively thin profile, and if the slot in the leader is round, there will be a greater movement permitted for the thinner profile of the tape in a given direction, whereas the motion in the orthogonal plane is much restricted relatively. Further, in some embodiments, the slot in the leader is larger than the tape such that the leader is able to pivot about the tape such that as the leader travels through a conduit, it may pivot even if the tape is not.

The cavity internal to the leader ("cavity" on FIG. 14 D) has at least one portion large enough to receive a folded over piece of the fish tape, larger/wider cavity portion 60 and the at least one smaller/narrower channel portion 62 (i.e., the channel between the cavity and the outside through which the tape is routed) is sufficiently narrow to not allow the folded over portion of the tape to be inadvertently pulled through, but still wide enough to permit the tape to pivot with respect to the leader and vice versa.

In various embodiments, wider cavity portion 60 has straight walls. In the embodiment of FIG. 14 D, the cavity walls at the wider portion are not only straight, they are parallel such that the shape of the cavity is cylindrical in wider portion 60. In various embodiments, narrower cavity portion 62 has straight walls. In the embodiment of FIG. 14 D, the cavity walls at the narrower portion are not only straight, they are parallel such that the shape of the cavity is cylindrical in narrower portion 62.

In this embodiment, there is a transition 64 between wider portion 60 and narrower portion 62. Thus, several embodiments, including the one illustrated in FIG. 14 D have a stepped recess allowing for the tape.

Figure 15A:
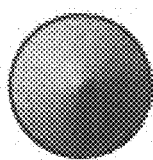
FIG. 15A is a bottom view of an exemplary embodiment fish tape leader.
Figure 15B:
FIG. 15B is a top perspective view of the exemplary embodiment fish tape leader of FIG. 15A.
Figure 15C:
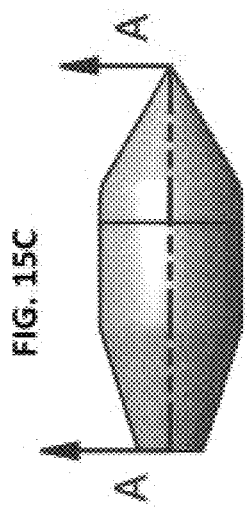
FIG. 15C is a bottom view of the exemplary embodiment fish tape leader of FIGS. 15A-B.
Figure 15F:
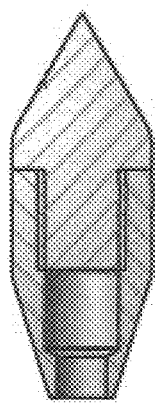
FIG. 15F is a cross-sectional side view of the exemplary embodiment fish tape leader of FIGS. 15A-E.
Figure 15D:
FIG. 15D is a bottom perspective view of the exemplary embodiment fish tape leader of FIG. 15A-C.
Figure 15E:
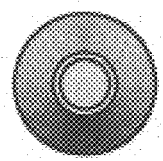
FIG. 15E is a top view of the exemplary embodiment fish tape leader of FIG. 15A-D.
Figure 15G:
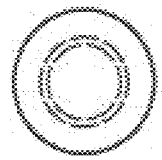
FIG. 15G is a top view showing interior hidden surfaces of a lower portion of exemplary embodiment fish tape leader of FIGS. 15A-F.
Figure 15H:
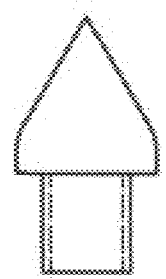
FIG. 15H is a side view of the lower portion showing interior hidden surfaces of the exemplary embodiment fish tape leader of FIGS. 15A-G.
Figure 15I:
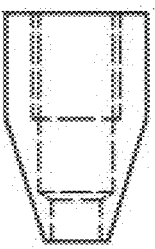
FIG. 15I is a side view of an upper portion showing interior hidden surfaces of the exemplary embodiment fish tape leader of FIGS. 15A-H.
Figure 15J:
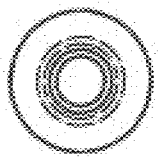
FIG. 15J is a front view of the upper portion showing interior hidden surfaces of the exemplary embodiment fish tape leader of FIGS. 15A-I.

FIGS. 15A-J illustrate various views of another exemplary embodiment of the present invention.

The various components and members of the present invention may be comprised wholly or in part of any suitable materials including, but not limited to, steel, aluminum, ceramic, wood, alloys, plastic, rubber, carbon fiber, fiberglass, and stainless steel.

While the specification has been described in detail with respect to specific embodiments thereof, it will be appreciated that those skilled in the art, upon attaining an understanding of the foregoing, may readily conceive of alterations to, variations of, and equivalents to these embodiments. Also note that the housing and other components may be of any suitable shape depending on the desired application for the device. Accordingly, the scope of the present invention should be assessed as that of the appended claims and any equivalents thereto.

What is claimed is:

1. A fish tape leader comprising:
a leader body extending along a longitudinal axis between a first end and a second end, said leader body comprises a cylindrical portion and a tail portion that extends from said cylindrical portion to said second end, wherein said leader body further comprises an internal through hole between said first end and said second end, wherein said internal through hole has a stepped portion and is configured for receiving a frustoconical cap having a closed end at said first end and a crimped end of a fish tape through said second end; and wherein said tail portion and second end of said leader body is frustoconically shaped.

2. The fish tape leader of claim 1, wherein the stepped portion includes at least two portions, a wider portion and a narrow portion.

3. The fish tape leader of claim 2, wherein at least one of said wider portion and said narrower portion has straight walls.

4. The fish tape leader of claim 1, wherein said internal through hole includes at least two portions, a wider portion and a narrower portion and both said wider portion and said narrower portion have straight walls, and at least one of said wider portion and said narrower portion has parallel walls such that the internal through hole has a cylindrical shape at said at least one of said narrower portion and said wider portion.

5. The fish tape leader of claim 1, wherein said internal through hole includes at least two portions, a wider portion and a narrower portion and both of said wider portion and said narrow portion have straight and parallel walls and each has a cylindrical shape.

* * * * *